US009046916B2

(12) United States Patent
Ruehle

(10) Patent No.: US 9,046,916 B2
(45) Date of Patent: Jun. 2, 2015

(54) CACHE PREFETCH FOR NFA INSTRUCTIONS

(71) Applicant: Intel Corporation, Santa Clara, CA (US)

(72) Inventor: Michael Ruehle, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 13/669,528

(22) Filed: Nov. 6, 2012

(65) Prior Publication Data

US 2014/0129775 A1 May 8, 2014

(51) Int. Cl.
*G06F 12/08* (2006.01)
*G06F 9/00* (2006.01)
*G06F 12/06* (2006.01)

(52) U.S. Cl.
CPC .............. *G06F 9/00* (2013.01); *G06F 12/0802* (2013.01); *G06F 12/0868* (2013.01); *G06F 12/0646* (2013.01)

(58) Field of Classification Search
CPC ..... G06F 9/00; G06F 12/0646; G06F 12/0802; G06F 12/0868
See application file for complete search history.

(56) References Cited

U.S. PATENT DOCUMENTS

| 6,490,652 | B1 * | 12/2002 | Van Hook et al. ............ 711/118 |
| 6,745,291 | B1 * | 6/2004 | York .............................. 711/128 |
| 7,805,392 | B1 * | 9/2010 | Steele et al. ..................... 706/48 |
| 8,516,456 | B1 * | 8/2013 | Starovoitov et al. .......... 717/141 |

* cited by examiner

*Primary Examiner* — Aracelis Ruiz
(74) *Attorney, Agent, or Firm* — Douglas A. Dallmann

(57) ABSTRACT

Disclosed is a method of pre-fetching NFA instructions to an NFA cell array. The method and system fetch instructions for use in an L1 cache during NFA instruction execution. Successive instructions from a current active state are fetched and loaded in the L1 cache. Disclosed is a system comprising an external memory, a cache line fetcher, and an L1 cache where the L1 cache is accessible and searchable by an NFA cell array and where successive instructions from a current active state in the NFA are fetched from external memory in an atomic cache line manner into a plurality of banks in the L1 cache.

18 Claims, 1 Drawing Sheet

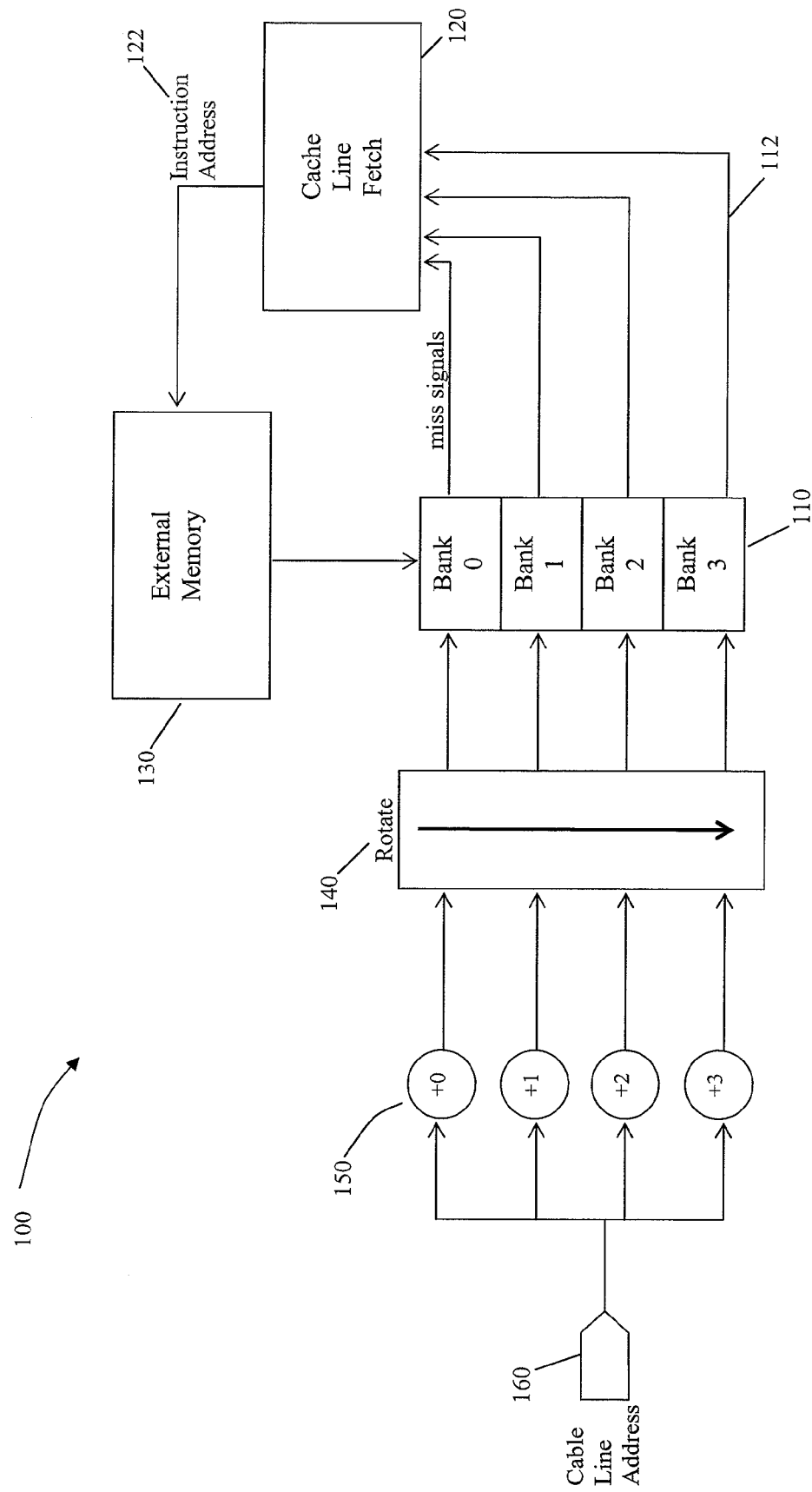

CACHE PREFETCH FOR NFA INSTRUCTIONS

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols like TCP, IP or MAP. Further, instructions in other languages may be included with these standards, such as Java and Visual Basic. As information is transported across a network, there are numerous instances when information may be interpreted to make routing decisions. It is common for protocols to be organized in a matter resulting in protocol specific headers and unrestricted payloads. Subdivision of the packet information into packets and providing each packet with a header is also common at the lowest level. This enables the routing information to be at a fixed location thus making it easy for routing hardware to find and interpret the information.

SUMMARY OF THE INVENTION

An embodiment of the invention may therefore comprise a method for fetching instructions for an NFA in a dynamically configurable NFA cell array, the method comprising requesting an instruction from an L1 cache for an NFA state in the cell array, determining, by the cache, if a cache line for the requested instruction is present in the cache and if at least one successive cache line is present in the cache, if the cache line is absent, fetching the cache line from an external memory, if the at least one successive cache line is absent, fetching the successive cache line from an external memory and if the cache line is present, returning the requested instruction.

An embodiment of the invention may further comprise a system for pre-fetching instructions for an NFA in a dynamically configurable NFA cell array, comprising an external memory that stores all of the NFA instructions, a cache line fetcher enabled to access instructions from the external memory and an L1 cache, wherein the L1 cache comprises a plurality of separately addressable tag memory banks, the banks being enabled to store tags for a predetermined number cache lines from the external memory in an interleaved manner, wherein the L1 cache is accessible and searchable by the NFA cell array and each time the L1 cache is accessed to read an NFA instruction, multiple tag memory banks are accessed in parallel.

BRIEF DESCRIPTION OF THE DRAWINGS

FIG. 1 is an embodiment of an architecture for pre-fetching NFA instructions.

DETAILED DESCRIPTION OF THE EMBODIMENTS

With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are well known in the prior art and are used for pattern matching and lexical analysis. Regular expressions provides a concise and flexible means for "matching" strings of text, such as particular characters, words, or patterns of characters. Abbreviations for "regular expression" include "regex" and "regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings Examples of specifications that could be expressed in a regular expression are as follows:
- the sequence of characters "car" appearing consecutively in any context, such as in "car", "cartoon", or "bicarbonate"
- the sequence of characters "car" occurring in that order with other characters between them, such as in "Icelander" or "chandler"
- the word "car" when it appears as an isolated word
- the word "car" when preceded by the word "blue" or "red"
- the word "car" when not preceded by the word "motor"
- a dollar sign immediately followed by one or more digits, and then optionally a period and exactly two more digits (for example, "$100" or "$245.98").

These sequences are simple and are intended only for purposes of example. Specifications of great complexity are conveyable by regular expressions.

Regular expressions are used by many text editors, utilities, and programming languages to search and manipulate text based on patterns. Some of these languages, including Perl, Ruby, AWK, and Tcl and may integrate regular expressions into the syntax of the core language itself. Other programming languages like .NET languages, Java, and Python provide regular expressions through standard libraries.

To match regular expressions or similar pattern matching rules, two main types of state machines may be constructed, nondeterministic and deterministic finite automata (NFAs and DFAs). NFAs for multiple rules are commonly executed separately, either in a sequential manner as in software, or in a parallel manner as in hardware.

Regular expressions, or similar rules, may be matched by executing an NFA (nondeterministic finite automaton) by the Thompson NFA execution algorithm in a dynamically reconfigurable hardware NFA cell array. This may be implemented as described in U.S. Pat. No. 7,899,304 to Ruehle, which is incorporated herein by reference in its entirety. The NFA cell array may be aided by matching the beginnings of most rules using an external engine, which may utilize a DFA (deterministic finite automation) or hash tables, where both the external engine and the NFA cell array examine the same stream of input symbols. However, the external engine, or other methodology as mentioned, may lead the NFA by a number of symbols. This number of symbols may vary depending on various factors, as is understood in the art. In operation, the external engine will match the beginning of a rule somewhere in the input stream. An "initial state" resulting from the external match, is dynamically loaded into the NFA cell array. The loaded state will be activated at an appropriate time in the NFA cell array. If the loaded state continues to match in the NFA, it may transition to next states. The next states will also have been loaded into the NFA cell array. This will continue until an accepting state is reached, which will complete the rule match and report same.

NFA states are represented in the NFA cell array by NFA instructions. In order to load a state as indicated above, one or more instructions representing the state must first be accessed in an L1C (level-one cache) inside the NFA engine. These instructions are then decoded and used to program NFA cells to represent the indicated state. An L1 Cache is utilized because the rule set may be large and each rule may be long and complex. Accordingly, the total number of instructions may be very large. When accessed, the L1 Cache, using any cache architecture as is understood in the art, may "hit", meaning the accessed instruction is present in a small local memory. If so, the instruction will be returned relatively quickly, e.g. 5 clock cycles. The instruction access may also "miss", meaning the accessed instruction is not present, and must be fetched from an external memory, which may take a relatively longer time, e.g. 60 clock cycles.

Throughout this description, the term L1 cache is used to denote a common memory location used for NFAs and for fetching instructions from an external memory. It is understood that embodiments of this invention may pertain to any cache storing NFA instructions. Accordingly, "L1" is not limiting to any particular type of memory utilized, such as an L2 cache. "L1 cache", as used throughout, includes all such cache type memories.

Initial state accesses are very tolerant of L1 cache misses because the external engine typically runs substantially ahead in the input stream, such as 100 symbols ahead of the NFA cell array. This lead gives the L1 cache time to resolve a miss before the initial state instructions are actually needed in the cell array. Even multiple overlapping L1 cache misses for initial states may be well tolerated since multiple overlapping accesses may be made to the external memory. Next state instruction accesses are more sensitive to L1 cache misses. This is because a next-state access typically occurs when the NFA cell array is already at a position in the input steam where the previous state is active. The next state may be needed immediately or in a shorter period of time than it takes to access an instruction from external memory.

In an embodiment of the invention, cache line pre-fetch using multiple independently addressable tag memory banks is employed. Flags may be encoded in the last NFA instruction associated with each regular expression and used by the cache to limit the pre-fetch. Maximum pre-fetch (tail length) fields encoded in the NFA or the external engine, or both, may be used to limit pre-fetch of an NFA instruction cache.

FIG. 1 is an embodiment of an architecture for pre-fetching NFA instructions. The architecture 100 has a number of separately addressable tag memory banks (B) 110. Miss signals 112 are receivable from the tag memory banks 110 by cache line fetch device 120. The cache line fetch device is enabled to provide an instruction address 122 to an external memory 130 which contains all of the instructions for the NFA in use. The external memory 130 contains all of the instructions for every state in the NFA. In another embodiment, the external memory 130 may be a level-two cache, which may not contain all of the instructions, but rather may need to access a still higher level memory or cache for some instructions. A cache line address 160 has N consecutive offsets 150 from 0 to B−1 added, and the resulting sequence of B consecutive cache line addresses is rotated 140 according to lower bits in the cache line address 160, so that each cache line address is directed to the proper bank. Each of the B rotated 140 cache line addresses has lower bits dropped, to form a row address to access the corresponding tag memory bank 110.

In a cache line pre-fetch (CLP) system, and methodology, two parameters are determined for any particular implementation of the architecture 100. The first is the number of instructions (N) in a cache line. The second is the number of separately addressable tag memory banks (B) 110 that the L1 cache tag memory will be divided into. N and B may both be powers of two, i.e. 2, 4, 8, 16, etc. Since the B tag memory banks can be accessed in parallel to check for the presence of N instructions each, the product of N×B is approximately the number of instructions beyond the last accessed instruction that will be pre-fetched so that they are available in the L1 Cache. This value, N×B, may be predetermined to exceed the typical or worst case number of instructions consumed in the time required to fetch instructions from an external memory 130. For example, if external memory accesses take 60 cycles, and no more than one instruction per 5 cycles is typically consumed while matching a rule, then 12 instructions (60÷5) may be consumed during the expected access latency. Accordingly N×B=16 may be an appropriate power-of-two product.

The L1 cache may be a W-way set associative cache, e.g. W=4. This means that the cache line memory locations are organized into W columns and some number R of rows. For example, if N=4 and W=4, and the L1 cache holds 1024 instructions, then there are 256 lines (1024÷4) which means there are 64 rows (256÷4). Each accessed instruction will be found within an associated cache line. The instruction address is typically converted to a cache line address by dropping a number of least significant bits equal to log 2(N). The cache line address is converted to a cache row address. This is typically done by dropping upper bits to leave the necessary number of lower bits to address a single row, e.g. 6 lower bits are retained when R=64 (2^6). All W=4 columns (ways) of the corresponding cache row are then examined to see if they contain the accessed cache line. They may contain different cache lines with the same lower address bits, or they may be empty, which is common for caches.

The B tag memory banks contain cache line tags that identify which cache lines currently occupy the L1 Cache. The R cache rows are divided equally among the B banks. Each bank has W columns, but only R/B rows. For example, if N=4, W=4, R=64, and B=4, then each bank has 4 columns and 16 rows. To check the cache for an accessed cache line, only one bank, containing the associated row needs to be accessed. The cache rows are interleaved among the banks, so that any B consecutive cache lines (or rows) reside as one row in each bank. Accordingly, the tags for any series of consecutive cache lines which is equal to the number of tag memory banks will reside as one tag in each bank. The low log 2(B) bits of any row address may be used to select a bank and the remaining upper row address bits may be used as an address within that bank.

Each time the L1 Cache is accessed to read an NFA instruction, which falls within some N-instruction cache line (L), all B tag memory banks are accessed in parallel to search for cache lines L, L+1, L+2, . . . L+B−1. For example, if instruction address 25 is accessed, with N=4, W=4, and B=4, dropping two low bits (dividing by N=4), instruction 25 is found to be in cache line L=6. Line 6 will map to bank 2, as (L mod B)=(6 mod 4)=2. The L1 cache then accesses all 4 banks to search for 4 cache lines as follows: bank 2 for line 6, bank 3 for line 7, bank 0 for line 8, and bank 1 for line 9. Referring to FIG. 1, this example corresponds to cache line address 160 of 6 having offsets of +0 through +3 added 150, obtaining line addresses {6, 7, 8, 9}, followed by a rotation 140 of (6 mod 4)=2 positions, yielding the line addresses {8, 9, 6, 7}, mapping to banks {0, 1, 2, 3} respectively.

In a single access cycle, the L1 cache will be searched for the cache line containing the accessed instruction and also the next B−1 cache lines. A hit or miss is determined separately for each of these lines. If there is a miss, then one or more cache lines are fetched from the external memory to fill all missed lines into the L1 Cache. Only the first line (1) is needed to respond to the instruction access. The remaining B−1 lines will represent the pre-fetch. If Line L is a hit, then the requested instruction will be returned immediately without waiting for any pre-fetch misses to be filled. Otherwise, the requested instruction should be returned after line L is filled from external memory. In an embodiment, if multiple of the B accessed cache lines miss, they may be fetched from the external memory in a single burst, from the first missed line to the last missed line, because typical external memories operate more efficiently in larger bursts. In another embodiment, one burst may be generated for each contiguous segment of missed cache lines.

If new instructions are accessed substantially sequentially and not too frequently, cache line pre-fetch ensures that although initial state accesses may miss the L1 cache, next state accesses will hit. If instructions are accessed significantly out of order, for example with a jump of 10 or 20 instructions, or if next states are accessed very rapidly, then cache line pre-fetch may not always maintain next state accesses. Some misses may result. However, L1 Cache next-state miss rates are minimized. Moreover, next-state L1 Cache misses that occur with CLP will also have minimized delays to return instructions. This is because a missed instruction is likely to have been pre-fetched some time previous to its access time and will already be in the process of being fetched.

"Last flag" annotations in NFA instructions may be used to minimize the unnecessary pre-fetching of instructions unrelated to a current rule. This may happen when a rule would terminate, but the instruction pre-fetch was processed for instructions beyond the current rule instructions. This may be accomplished by using such techniques as depth-first-search (DFS) ordering of NFA instructions to group the instructions for each rule together and substantially in the order they will be accessed to match each rule. The compiler will then identify the sequentially last instruction associated with each rule and set a "last flag" in that instruction. This, in turn, may be accomplished by setting a predetermined bit within the instructions to '1'. It is understood that there may be variances in the manner in which a rule may flow through an NFA graph. Accordingly, variances may be made to the setting of "last flags". For example, it is understood that there may be circumstances in which a single expression has multiple, long branches of states. The last instruction in a major branch may be flagged. Following instructions in another branch are not likely to be accessed next. Another manner of handling varying circumstances may be to set a "last flag" on the final instruction of any state that does not transition to another state within the following few instructions, such as 16 instructions, for example.

The "last flags" are consumed by the cache. Accordingly, if the cache encounters a "last flag" in an instruction that has been fetched, the cache will drop data for all subsequent fetches. In this manner, the cache will not be polluted with fetches that occurred after the arrival of "last flag" instruction.

One purpose of "last flags" is that the L1 Cache will not pre-fetch across them. This is because the instructions following the last-flagged instruction should not be closely related. In fact, the following instructions may be pollution as noted above. This purpose can be enforced by one of at least two methods. First, when a burst of multiple cache lines fetched from external memory returns to the L1 cache, the instructions are inspected for last flags prior to writing them into the cache memory. "Last flags" in the first cache line prior to the position of the originally accessed instruction are ignored. This is because they do not pertain to the rule being matched. However, if any "last flag" appears in or after the originally accessed instruction, the first one appearing causes a special action. The containing cache line will be the last line written into the cache memory. Any following cache lines are discarded. This prevents cache lines entirely after the first "last flag" from polluting the L1 Cache.

Second, when an instruction is accessed in the L1 Cache, and the B cache lines L, L+1, . . . L+B−1 are checked, if any of the cache lines is a 'hit' and contains a "last flag", the first such "last flag" also triggers special processing. Any misses in higher cache lines are ignored and not fetched from external memory. The result is that cache lines entirely after the first "last flag" are not unnecessarily pre-fetched, thus reducing external memory access bandwidth. It also prevents repeatedly pre-fetching the after—"last flag" cache lines and dropping them when they may return.

An example of this is instructions starting with instruction 25 are accessed. However, instructions 25 through 30 are the only instructions associated with the particular rule in consideration. The compiler will flag "last" in instruction 30. On the initial state fetch of instruction 25 when a state is activated in the NFA, there may be a cache miss, resulting in fetching lines 6-9, or instructions 24-39, from external memory. This computes where each cache line is 4 instructions long so that line 6 equals instructions 24-27, line 7 equals instructions 28-31, line 8 equals instructions 32-35 and line 9 equals instructions 36-39. As the instructions are fetched and returned to the cache, instruction 30 in cache line 7 is seen by the cache to have a last flag set. Lines 6 and 7 are written into the cache memory but lines 8 and 9 are dropped. This avoids polluting the cache. Next, instruction 26 will be accessed. When access occurs, lines 6-9 are checked again. As noted, this is done regularly to ensure that future cache lines will be present when needed. Lines 6-7 will hit. Lines 8-9 will miss due to the fact that they were just previously dropped due to the "last flag" annotation in an instruction in line 7. The cache instructions are re-checked and because line 7 still contains a last flag in instruction 30, the misses are ignored and lines 8-9 are not fetched.

The "last flag" component in instructions eliminates a substantial amount of L1 Cache pollution by instructions which are irrelevant to the rule being matched. It also reduces unnecessary external memory pre-fetch bandwidth, but it leaves some unnecessary pre-fetch bandwidth for L1 Cache misses on initial state accesses.

Another component, used in initial state accesses, may be "tail length" fields. The external engine is programmed to match rule beginnings. The external engine will then signal to the NFA cell array to activate an associated NFA state at an associated input stream position. The activation signal from the external engine will contain certain information about the target NFA state. This may include the address of the first instruction for the NFA state and the number of instructions for that state. These may reside in instructions compiled for the DFA engine or hash tables utilized as the external engine. The compiler writing the external engine instructions will examine the NFA instructions being referenced and count the number of instructions to the first "last flag" appearing. The count may, or may not, include the instructions of the initial state itself. The count is then encoded as a "tail length" field in the external engine instructions along with the initial NFA state reference. The "tail length" encoding and NFA state reference are signaled to the NFA cell array L1 Cache as part of the initial state fetch request. When the L1 Cache processes an initial state fetch request containing a tail length field, it will limit the pre-fetch to the indicated length. This is where it can expect to find a last flag. As with the "last flags", this will prevent wasted pre-fetch bandwidth and possible L1 Cache pollution.

"Tail length" fields may also be used in NFA instructions. For example, whenever an NFA instruction contains a reference to a next state, a "tail length" field can also be present. This will indicate the remaining instructions after (or including) the next state to a "last flag". Alternatively, only some NFA instructions with next state references may contain a "tail length" field, such as if certain instruction formats do not have room for that field. An NFA cell programmed with such an instruction will store the "tail length" field along with the next state reference and this will be submitted to the L1 Cache when the cell generates an L1 Cache request for its next state. Due to "last flag" processing, "tail length" fields in NFA instructions are often superfluous. However, they can be utilized if the next last flag is not present in the L1 Cache because its instruction has been evicted, or because the next state reference jumps to a distant address that has not been pre-fetched.

If tail length fields always appear in NFA instructions with next state references, then actual "last flags" are not necessary. Every L1 Cache assess will carry a tail length to prevent cache pollution and unnecessary pre-fetch bandwidth. This will be accomplished without "last flag" processing. However, it may be more expensive to include "tail length" fields in all NFA instructions with next state references than to include tail length fields only with initial state references in instructions for the external engine. In such a case, both "last flags" and "tail length" fields may be used.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for fetching instructions for an NFA in a dynamically configurable NFA cell array, said method comprising:
   requesting an instruction from an L1 cache for an NFA state in the cell array;
   determining, by the cache, if a cache line for the requested instruction is present in the cache and if at least one successive cache line is present in the cache;
   if the cache line is absent, fetching the cache line from an external memory;
   if the at least one successive cache line is absent, fetching the successive cache line from an external memory;
   if the cache line is present, returning the requested instruction;
   encoding a last flag in at least one instruction;
   if a previous returning cache line contains a last flag, discarding subsequent fetched cache lines returning to the cache; and
   if a previous cache line present in the cache contains a last flag, suppressing fetching a cache line absent from the cache.

2. The method of claim 1, wherein each cache line comprises at least two instructions.

3. The method of claim 1, wherein the step of determining if a cache line is present comprises determining the presence of multiple cache lines in parallel within multiple independently addressable tag memory banks.

4. The method of claim 3, wherein:
   tags for sequential cache lines are interleaved among the tag memory banks; and
   said tags for any series of consecutive cache lines equal in number to the number of tag memory banks reside as one tag in each bank.

5. The method of claim 4, said method further comprising providing tail length information along with the request for an instruction.

6. The method of claim 5, wherein the number of said successive cache lines fetched from external memory in response to said request is limited by the tail length information provided with said request.

7. The method of claim 1, wherein:
   the NFA represents a set of rules; and
   the sequentially last instruction associated with each rule is flagged with a last flag.

8. The method of claim 1, wherein the final instruction of a major branch of the NFA is flagged with a last flag.

9. The method of claim 1, wherein the final instruction of any state that does not transition to another state within a predetermined number of instructions is flagged with a last flag.

10. The method of claim 1, wherein the step of determining if a cache line is present comprises determining the presence of multiple cache lines in parallel within multiple independently addressable tag memory banks.

11. The method of claim 10, wherein:
   tags for sequential cache lines are interleaved among the tag memory banks; and
   said tags for any series of consecutive cache lines equal in number to the number of tag memory banks reside as one tag in each bank.

12. The method of claim 1, said method further comprising providing tail length information along with the request for an instruction.

13. The method of claim 12, wherein the number of said successive cache lines fetched from external memory in response to said request is limited by the tail length information provided with said request.

14. The method of claim 13, wherein said tail length information is encoded in a parent state instruction comprising a reference to said requested instruction, said method further comprising obtaining said tail length information from said parent state instruction to provide with said request.

15. A system for pre-fetching instructions for an NFA in a dynamically configurable NFA cell array, comprising:
   an external memory that stores all of the NFA instructions;
   a cache line fetcher enabled to access instructions from said external memory; and
   an L1 cache, wherein said L1 cache comprises a plurality of separately addressable tag memory banks, said banks being enabled to store tags for a predetermined number cache lines from the external memory in an interleaved manner;
   wherein said L1 cache is accessible and searchable by the NFA cell array and each time the L1 cache is accessed to read an NFA instruction, multiple tag memory banks are accessed in parallel;
   wherein if a miss results from the search for said cache line and successive cache lines then at least one cache line is fetched from the external memory to fill all missed cache lines into the L1 cache;
   wherein at least one instruction comprises a last flag, and wherein:
      if a previous returning cache line contains a last flag, subsequent fetched cache lines returning to the cache are discarded; and
      if a previous cache line present in the cache contains a last flag, a fetch request for a cache line absent from the cache is suppressed.

16. The system of claim 15, wherein in a single access cycle the L1 cache is searched for a cache line containing the accessed instruction and for the next successive cache lines.

17. The system of claim 15, wherein the L1 cache is enabled to limit the number of next successive cache lines fetched according to a tail length parameter provided with an instruction request.

18. The system of claim 15, wherein the L1 cache is enabled to limit the number of next successive cache lines fetched according to a tail length parameter provided with an instruction request.

* * * * *